(12) United States Patent
Yonemura et al.

(10) Patent No.: US 8,780,423 B2
(45) Date of Patent: Jul. 15, 2014

(54) PAPER CONVEYING APPARATUS

(71) Applicant: PFU Limited, Kahoku (JP)

(72) Inventors: Shigeru Yonemura, Kahoku (JP); Kouji Kawase, Kahoku (JP); Hirotoshi Kakuda, Kahoku (JP)

(73) Assignee: PFU Limited, Kahoku-shi (JP)

( * ) Notice: Subject to any disclaimer, the term of this patent is extended or adjusted under 35 U.S.C. 154(b) by 0 days.

(21) Appl. No.: 13/857,393

(22) Filed: Apr. 5, 2013

(65) Prior Publication Data

US 2014/0063573 A1 Mar. 6, 2014

(30) Foreign Application Priority Data

Sep. 5, 2012 (JP) ................................. 2012-195279

(51) Int. Cl.
*H04N 1/04* (2006.01)
*G06K 15/00* (2006.01)
*H04N 1/40* (2006.01)
*B65H 31/00* (2006.01)
*B65H 3/44* (2006.01)

(52) U.S. Cl.
USPC .......... 358/498; 358/474; 358/1.12; 358/444; 271/207; 271/9.01

(58) Field of Classification Search
USPC ......... 358/498, 474, 1.12, 444; 271/207, 9.01
See application file for complete search history.

(56) References Cited

U.S. PATENT DOCUMENTS

| 6,859,636 | B2 | 2/2005 | Mitomi | |
|---|---|---|---|---|
| 7,954,803 | B2 * | 6/2011 | Kitagawa et al. | ............ 271/9.01 |
| 2002/0036808 | A1 | 3/2002 | Tohyama et al. | |
| 2002/0036809 | A1 | 3/2002 | Tohyama et al. | |
| 2003/0063337 | A1 * | 4/2003 | Shirai et al. | .................... 358/498 |
| 2003/0210433 | A1 * | 11/2003 | Westcott et al. | .............. 358/474 |
| 2005/0254103 | A1 | 11/2005 | Sugiyama et al. | |
| 2006/0203308 | A1 * | 9/2006 | Shirai et al. | .................... 358/498 |
| 2008/0265497 | A1 * | 10/2008 | Kimura et al. | ................ 271/228 |
| 2010/0309528 | A1 * | 12/2010 | Nacman et al. | ................ 358/444 |
| 2011/0273753 | A1 * | 11/2011 | Yonemura et al. | ............ 358/498 |
| 2011/0279840 | A1 * | 11/2011 | Iwayama | ..................... 358/1.12 |
| 2012/0193867 | A1 * | 8/2012 | Nagao | ........................... 271/207 |

FOREIGN PATENT DOCUMENTS

| JP | 06-189094 | 7/1994 |
|---|---|---|
| JP | 10-190938 | 7/1998 |
| JP | 2002-101259 | 4/2002 |
| JP | 2002-152461 | 5/2002 |
| JP | 2005-328216 | 11/2005 |

* cited by examiner

Primary Examiner — Charlotte M Baker
Assistant Examiner — Rury Grisham
(74) Attorney, Agent, or Firm — Christie, Parker & Hale, LLP (57) ABSTRACT

There are provided a paper conveying apparatus that can prevent a drop in quality of the image data while enabling stable conveyance of paper. The paper conveying apparatus includes a first image capture unit, a second image capture unit, a pair of conveyor rollers including a first roller and a second roller, a first conveyor guide, and a second conveyor guide, wherein a nip position of the pair of conveyor rollers is arranged above an extended plane of a top surface of the first image capture unit extended to the pair of conveyor rollers side, an axis of rotation of the second roller is arranged offset to the first image capture unit side compared with an axis of rotation of the first roller at projections on the extended plane, and the first conveyor guide guides the medium conveyed to above from the extended plane, to make the medium turn downward.

9 Claims, 10 Drawing Sheets

PAPER CONVEYING APPARATUS

CROSS-REFERENCE TO RELATED APPLICATIONS

This application is based upon and claims the benefit of priority of prior Japanese Patent Application No. 2012-195279, filed on Sep. 5, 2012, the entire contents of which are incorporated herein by reference.

TECHNICAL FIELD

Embodiments discussed in the present specification relate to paper conveying technology.

BACKGROUND

In a scanner apparatus or other paper conveying apparatus which captures images of both surfaces of paper, an image capture unit which captures an image of a front surface and an image capture unit which captures an image of a back surface are often provided facing each other across the transport path of paper, so that the transport route of the apparatus is shortened in order to reduce the size of the apparatus. In this case, to enable conveyance of paper which has a certain degree of thickness, it is necessary to arrange the image capture surfaces of the image capture units separated by a certain extent. However, if the image capture surfaces of the image capture units are separated, there are the problems that the paper which is conveyed between the image capture surfaces ends up bringing wrinkled, the image becomes blurred at the time of capture, the brightness becomes uneven, etc., and the captured image data falls in quality.

An image reading apparatus which has a front surface reader which is arranged at an upper side of paper and a back surface reader which is arranged at a lower side, a pair of read rollers which are arranged at the reader inlets, and a pair of conveyor rollers which convey paper between the pair of read rollers has been disclosed. In this image reading apparatus, to enable paper to enter the reader at a slant, the pair of conveyor rollers and the pair of read rollers are arranged so that the nip positions are positioned above the transport path of paper and the axes of rotation of the lower rollers are positioned at the paper feed tray side from the axes of rotation of the upper rollers (see Japanese Laid-open Patent Publication No. 10-190938).

SUMMARY

Accordingly, it is an object of the present invention to provide a paper conveying apparatus which has an image capture unit which captures an image of a front surface of paper and an image capture unit which captures an image of a back surface and which prevents a drop in quality of the image data which is captured while enabling stable conveyance of paper.

According to an aspect of the apparatus, there is provided a paper conveying apparatus. The paper conveying apparatus includes a first image capture unit for capturing an image of a sheet shaped medium, a second image capture unit, arranged facing the first image capture unit above the first image capture unit, for capturing an image of a surface at an opposite side from the surface of the medium which the first image capture unit captures, a pair of conveyor rollers having a first roller which conveys the medium to the first image capture unit and the second image capture unit, and a second roller arranged facing the first roller above the first roller, a first conveyor guide arranged at the second image capture unit, and a second conveyor guide for guiding the medium to the pair of conveyor rollers, wherein a nip position of the pair of conveyor rollers is arranged above an extended plane of a top surface of the first image capture unit extended to the pair of conveyor rollers side, an axis of rotation of the second roller is arranged offset to the first image capture unit side compared with an axis of rotation of the first roller at projections on the extended plane, and the first conveyor guide guides the medium, which is guided from the second conveyor guide and is conveyed by the first roller to above from the extended plane, to make the medium turn downward.

DESCRIPTION OF EMBODIMENTS

Below, a paper conveying apparatus according to one aspect of the present invention will be explained with reference to the figures. However, the technical scope of the present invention is not limited to these embodiments and extends to the inventions described in the claims and their equivalents.

Figure 1A:
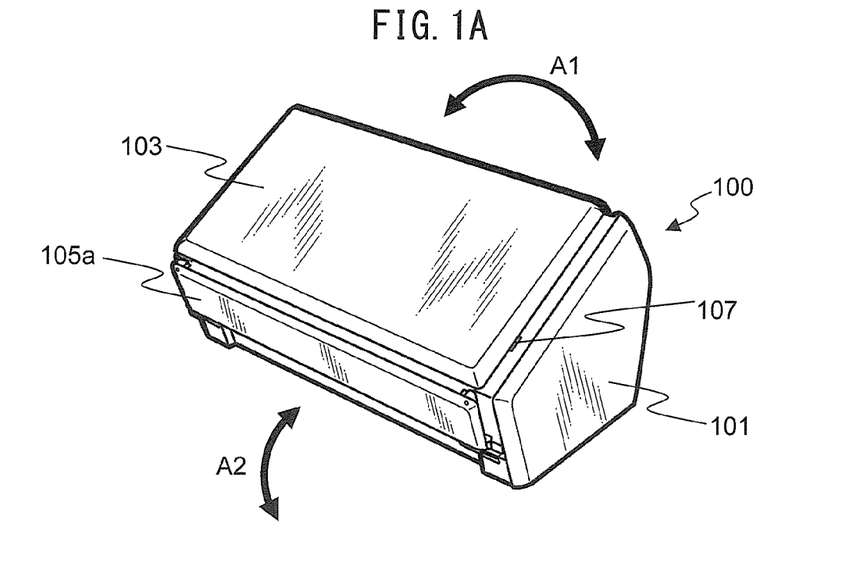
FIG. 1A is a perspective view of a paper conveying apparatus 100.
Figure 1B:
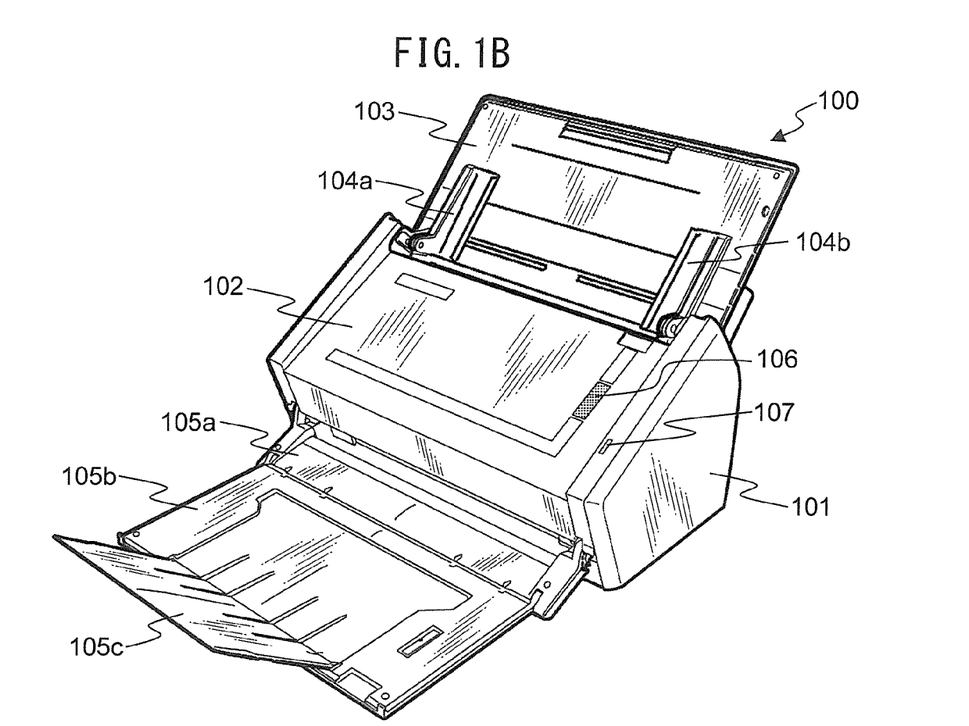
FIG. 1B is a perspective view of a paper conveying apparatus 100.

FIG. 1 is a perspective view which shows a paper conveying apparatus 100 which is configured as an image scanner.

FIG. 1A is a perspective view of a paper conveying apparatus 100 in the state where the paper tray 103 is not set, while FIG. 1B is a perspective view of a paper conveying apparatus 100 in the state where the paper tray 103 is set.

The paper conveying apparatus 100 has a lower housing 101, upper housing 102, paper tray 103, front surface cover 105*a*, top surface cover 105*b*, auxiliary cover 105*c*, operation button 106, opening detector 107, etc.

The upper housing 102 is arranged at a position which covers the top surface of the document conveying apparatus 100 and is engaged with the lower housing 101 by hinges so as to be able to be opened and closed at the time of a paper jam, at the time of cleaning the inside of the document conveying apparatus 100, etc.

The paper tray 103 is engaged with the lower housing 101 by hinges so as to be able to pivot in the direction which is shown by an arrow mark A1. The paper tray 103, in the state which is shown in FIG. 1A, is arranged at a position which covers the upper housing 102, top surface cover 105b, and auxiliary cover 105c and functions as an outer cover. On the other hand, the paper tray 103, in the state which is shown in FIG. 1B, is arranged to enable paper to be placed. The paper tray 103 is provided with side guides 104a and 104b which enable movement in the left and right directions with respect to the conveyance direction of paper. The side guides 104a and 104b can be matched with the width of the paper in position so as to restrict the width direction of the paper.

The front surface cover 105a is engaged with the lower housing 101 by hinges so as to enable pivoting in a direction which is shown by the arrow mark A2. The top surface cover 105b is connected with the front surface cover 105a at one end side and is connected with the auxiliary cover 105c at the other end side. The auxiliary cover 105c, when necessary, is opened up from the top surface cover 105b to hold paper.

The operation button 106 is arranged on the surface of the upper housing 102. If pushed, it generates and outputs an operation detection signal.

The opening detector 107 has a contact detection sensor which is arranged at a position which faces the paper tray 103 in the closed state and detects the opened/closed state of the paper tray 103. The opening detector 107 generates and outputs an opening detection signal which changes in signal value in the state where the paper tray 103 is opened and the state where it is closed.

Figure 2:
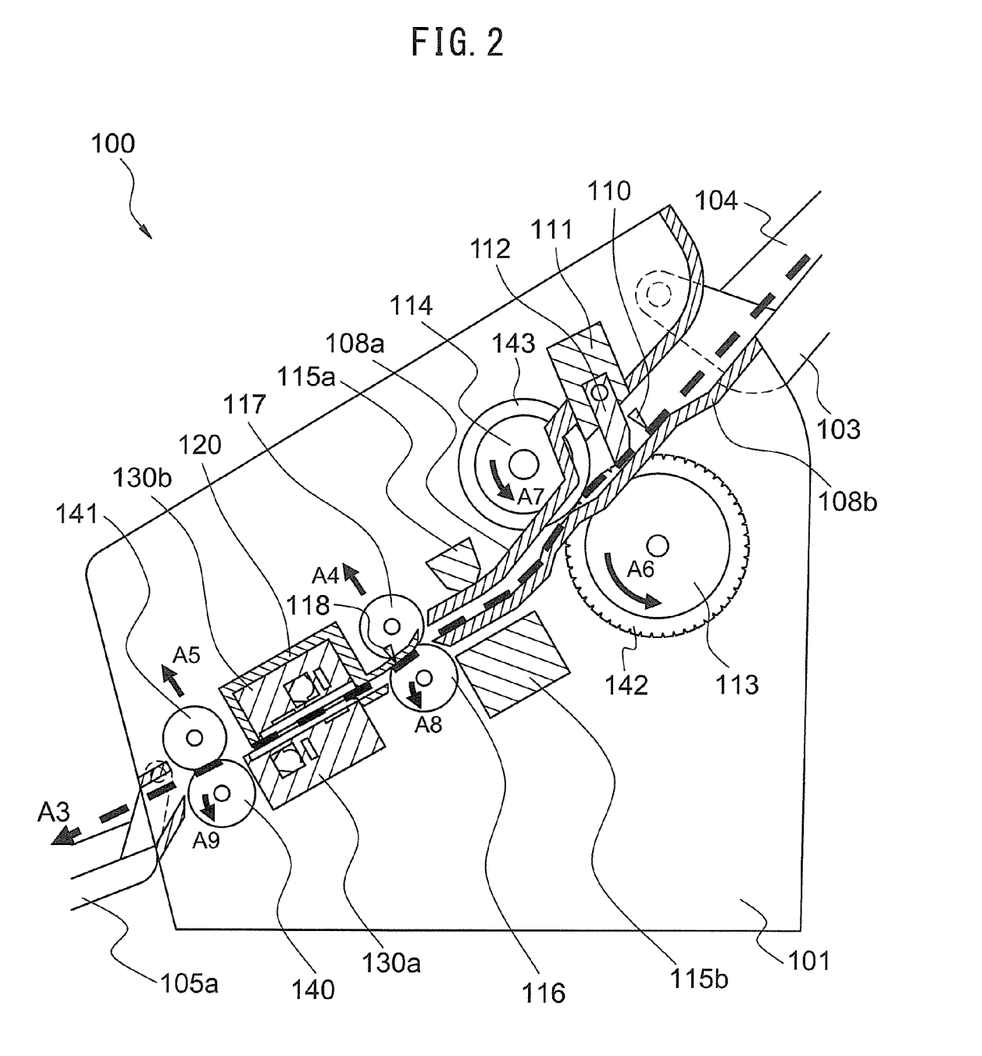
FIG. 2 is a view for explaining a transport route inside a paper conveying apparatus 100.

FIG. 2 is a view for explaining a transport route inside the paper conveying apparatus 100.

The paper conveying apparatus 100 has a first paper detector 110, pick arm 111, flap 112, the paper feed roller 113, retard roller 114, ultrasonic transmitter 115a, ultrasonic receiver 115b, first conveyor roller 116, first driven roller 117, second paper detector 118, image capture unit guide 120, first image capture unit 130a, second image capture unit 130b, second conveyor roller 140, second driven roller 141, etc.

The bottom surface of the upper housing 102 forms the upper guide 108a of the paper transport path, while the top surface of the lower housing 101 forms the lower guide 108b of the paper transport path. In FIG. 2, the arrow mark A3 shows the conveyance direction of paper. Below, "upstream" means upstream of the conveyance direction A3 of paper, while "downstream" means downstream of the conveyance direction A3 of paper.

The first paper detector 110 has a contact detection sensor which is arranged at the upstream side of the pick arm 111 and detects if a paper is placed on the paper tray 103. The first paper detector 110 generates and outputs a first paper detection signal which changes in signal value between the state where a paper is placed on the paper tray 103 and the state where it is not placed on it.

The paper feed roller 113 is supported to be able to rotate at the main body of the paper conveying apparatus 100. At the outer circumferential surface of the paper feed roller 113, a contact member 142 which contacts the paper which is placed on the paper tray 103 is provided. The contact member 142 is a member made of for example rubber etc., which has a large frictional force with paper.

The retard roller 114 is arranged facing the paper feed roller 113 and restricts conveyance in the conveyance direction A3 of paper which does not contact the paper feed roller 113. The retard roller 114 is supported to be able to rotate at the main body of the paper conveying apparatus 100. At the outer circumferential surface of the retard roller 114, a contact member 143 which contacts the paper which is placed on the paper tray 103 is provided. The contact member 143 is a member made of for example rubber etc. which has a large frictional force with paper.

The ultrasonic transmitter 115a and the ultrasonic receiver 115b are arranged near the paper transport path so as to face each other across the transport path. The ultrasonic transmitter 115a transmits an ultrasonic wave. On the other hand, the ultrasonic receiver 115b detects an ultrasonic wave which was transmitted by the ultrasonic transmitter 115a and passes through the paper and generates and outputs an electrical signal corresponding to the ultrasonic wave which was detected, that is, an ultrasonic wave signal. Below, the ultrasonic transmitter 115a and the ultrasonic receiver 115b will sometimes be referred to all together as an "ultrasonic sensor 115".

The first conveyor roller 116 and first driven roller 117 are supported to be able to rotate at the body of the paper conveying apparatus 100. The first conveyor roller 116 and the first driven roller 117 are arranged at the upstream side of the image capture units 130, while the first driven roller 117 is arranged facing the first conveyor roller 116 above the first conveyor roller 116. The first conveyor roller 116 is fastened, while the first driven roller 117 is arranged to be able to move above the first conveyor roller 116 (direction of arrow mark A4).

The second paper detector 118 has contact detection sensors which are arranged at the downstream side of the first conveyor roller 116 and the first driven roller 117 and at the upstream side of the first image capture unit 130a and the second image capture unit 130b and detects if there is paper in front of the first image capture unit 130a and the second image capture unit 130b. The second paper detector 118 generates and outputs a second paper detection signal between the state where there is paper in front of the first image capture unit 130a and the second image capture unit 130b and the state in which there is no paper there.

The second conveyor roller 140 and second driven roller 141 are supported to be able to rotate at the body of the paper conveying apparatus 100. The second conveyor roller 140 and second driven roller 141 are arranged at the downstream side of the image capture units 130, while the second driven roller 141 are arranged facing the second conveyor roller 140 above the second conveyor roller 140. The second conveyor roller 140 is fastened, while the second driven roller 141 is arranged to be able to move above the second conveyor roller 140 (direction of the arrow mark A5).

Figure 3:
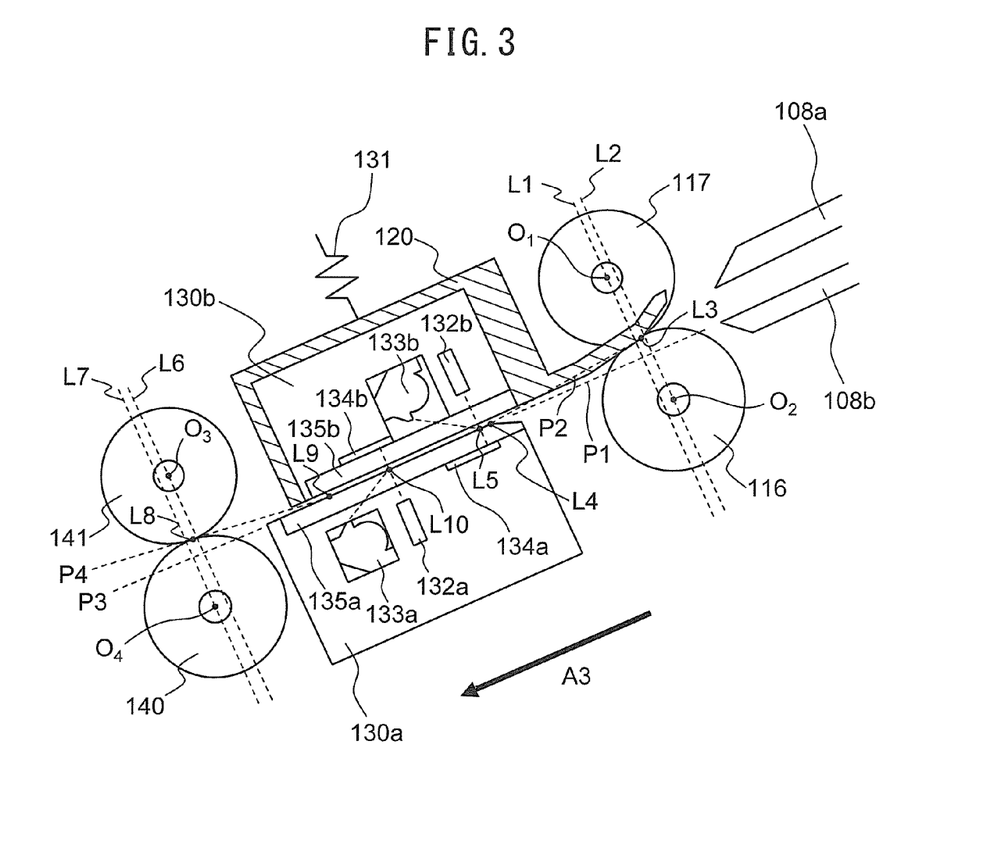
FIG. 3 is a view for explaining image capture units and a conveyance mechanism before and after the image capture units.

FIG. 3 is a view for explaining the image capture units and the conveyance mechanism before and after the image capture units.

The first image capture unit 130a captures an image of the front surface of the conveyed paper, while the second image capture unit 130b captures an image of the back surface of the conveyed paper. The second image capture unit 130b is arranged facing the first image capture unit 130a above the first image capture unit 130a. The second image capture unit 130b has an image capture unit guide 120 which guides paper between the first image capture unit 130a and the second image capture unit 130b. Further, the second image capture unit 130b is provided above it with an image capture unit spring 131. The image capture unit spring 131 is used to bias the unit in a direction heading toward the first image capture unit 130a side. Below, the first image capture unit 130a and the second image capture unit 130b will sometimes be referred to all together as the "image capture units 130".

The first image capture unit 130a has a first light source 132a, first image capture sensor 133a, first white reference part 134a, first glass surface 135a, etc. The second image capture unit 130b has a second light source 132b, second image capture sensor 133b, second white reference part 134b, glass surface 135b, etc.

The first light source 132a has RGB color LED (light emitting diodes) and a light guide member and emits light on the front surface of the paper which is conveyed to the image capture units 130 (when paper is not conveyed to image capture units 130, second white reference part 134b of facing second image capture unit 130b). Similarly, the second light source 132b has RGB color LEDs and a light guide member and emits light on the back surface of the paper which is conveyed to the image capture units 130 (when paper is not conveyed to image capture units 130, first white reference part 134a of facing first image capture unit 130a).

The first image capture unit 133a has a CIS (contact image sensor) of an equal magnification optical system type which is provided with an image capture element using CMOS's (complementary metal oxide semiconductors) which are arranged in a line in the main scan direction. The first image capture sensor 133a reads the front surface of the paper and generates and outputs an image signal. Similarly, the second image capture unit 133b has a CIS which is provided with an image capture element using CMOS's. The second image capture sensor 133b reads the back surface of the document and generates and outputs an image signal. Further, instead of CMOS's, it is also possible to utilize an image capturing sensor of a reduced magnification optical system type using CCD's (charge coupled devices).

The first white reference part 134a is arranged at a position facing the second image capture sensor 133b of the second image capture unit 130b. The second image capture sensor 133b generates an image signal which captures the first white reference part 134a when paper is not conveyed to the image capture units 130. Similarly, the second white reference part 134b is arranged at a position facing the first image capture sensor 133a of the first image capture unit 130a. The first image capture sensor 133a generates an image signal which captures the second white reference part 134b when paper is not conveyed to the image capture units 130. The paper conveying apparatus 100 can correct the image, such as shading based on the image signals which were captured by the first white reference part 134a and the second white reference part 134b.

As shown in FIG. 3, the position L1 of the center $O_1$ which forms the axis of rotation of the first driven roller 117 in the paper conveyance direction A3 is arranged offset from the position L2 of the center $O_2$ which forms the axis of rotation of the first conveyor roller 116 in the paper conveyance direction A3 to the image capture unit 130 side. Furthermore, the nip position L3 of the first conveyor roller 116 and first driven roller 117 is arranged above the extended plane P1 of the glass surface 135a of the first image capture unit 130a extended to the first conveyor roller 116 and the first driven roller 117 side. In particular, the position L4 where the tangent plane P2 which contacts the first conveyor roller 116 at the nip position L3 of the first conveyor roller 116 and the first driven roller 117, and the glass surface 135a of the first image capture unit 130a contact is arranged so as to become more to the first conveyor roller 116 and first driven roller 117 side compared with the image capture position L5 of the second image capture sensor 133b of the second image capture unit 130b.

The position L6 of the center $O_3$ which forms the axis of rotation of the second driven roller 141 in the center paper conveyance direction A3 is arranged offset from the position L7 of the center $O_4$ which forms the axis of rotation of the second conveyor roller 140 in the paper conveyance direction A3, to the image capture unit 130 side. Furthermore, the nip position L8 of the second conveyor roller 140 and the second driven roller 141 is arranged at the same height as the nip position of the first conveyor roller 116 and the first driven roller 117 with respect to the extended plane P3 of the glass surface 135a extended to the second conveyor roller 140 and the second driven roller 141 side. In particular, the position L9 where the tangent plane P4 which contacts the second conveyor roller 140 at the nip position L8 of the second conveyor roller 140 and the second driven roller 141, and the glass surface 135a of the first image capture unit 130a contact is arranged so as to become more to the second conveyor roller 140 and second driven roller 141 side compared with the image capture position L10 of the first image capture sensor 133a of the first image capture unit 130a. It is preferably arranged so that the angle of the tangent plane P4 with respect to the glass surface 135a becomes the same as the angle of the tangent plane P2 with respect to the glass surface 135a.

Figure 4A:
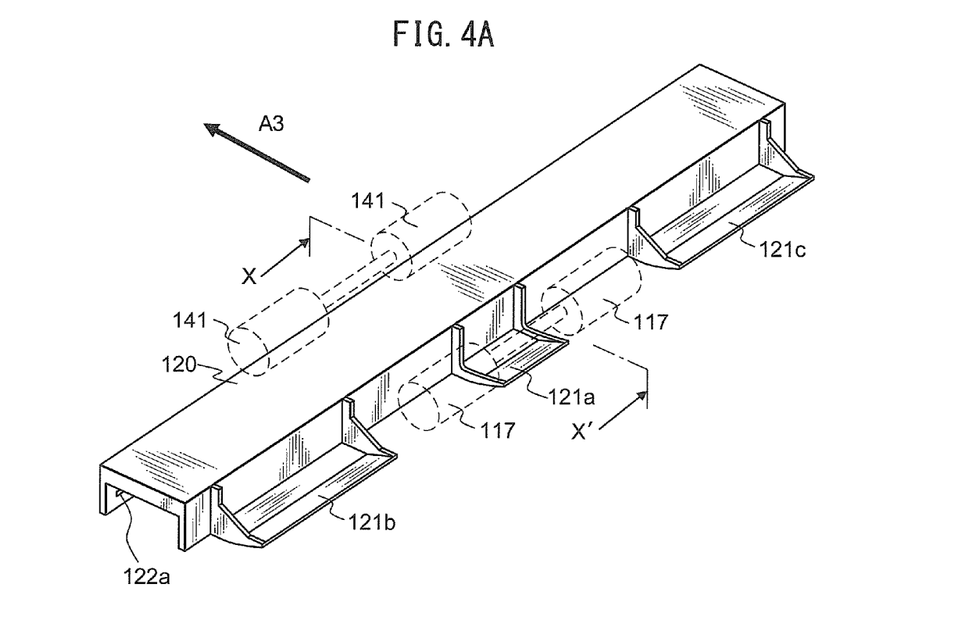
FIG. 4A is a perspective view of an image capture unit guide 120.
Figure 4B:
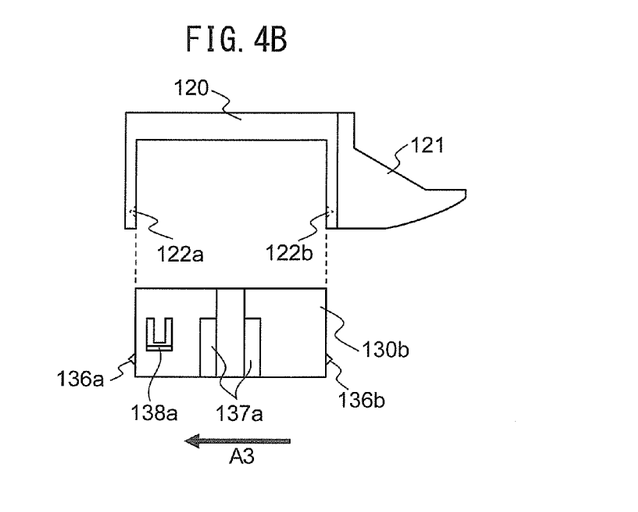
FIG. 4B is a side view of an image capture unit guide 120 and second image capture unit 130*b*.
Figure 4C:
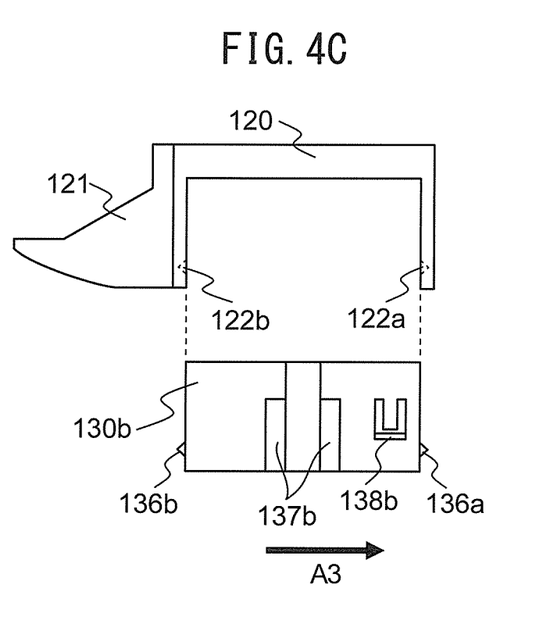
FIG. 4C is a side view of an image capture unit guide 120 and second image capture unit 130*b*.

FIG. 4A shows a perspective view of the image capture unit guide 120, while FIG. 4B and FIG. 4C show side views of the image capture unit guide 120 and the second image capture unit 130b.

As shown in FIG. 4A, the image capture unit guide 120 is provided with three guide members 121a, 121b and 121c in a direction perpendicular to the paper conveyance direction A3. Among the guide members 121a, 121b and 121c, the first driven roller 117 is arranged. Note that, the parts of the paper conveying apparatus 100 which are shown in FIG. 2 and FIG. 3 show views seen in the direction of the arrow marks X, X' from positions cutting parts of the guide member 121a of the image capture unit guide 120 at the arrow mark X-X' of FIG. 4A. Below, the guide members 121a, 121b and 121c will sometimes be referred to all together as the "guide members 121".

As shown in FIG. 4B and FIG. 4C, the image capture unit guide 120 is used covering the second image capture unit 130b by making recesses 122a and 122b which are provided at the image capture unit guide 120 engage with projections 136a and 136b which are provided at the second image capture unit 130b.

The second image capture unit 130b is provided with a first guide member 137a and first locking member 138a at a side surface at one end side in the direction which perpendicularly intersects the paper conveyance direction A3 and a second guide member 137b and second locking member 138b at the side surface at the other end side.

The first guide member 137a and second guide member 137b engage with rail parts (not shown) which are arranged inside of the paper conveying apparatus 100 and extend in a substantially vertical direction with respect to the paper conveyance direction A3.

The first locking member 138a and second locking member 138b engage with locking parts (not shown) which are respectively arranged inside of the paper conveying apparatus 100 whereby the second image capture unit 130b is prevented from dropping off.

Figure 5:
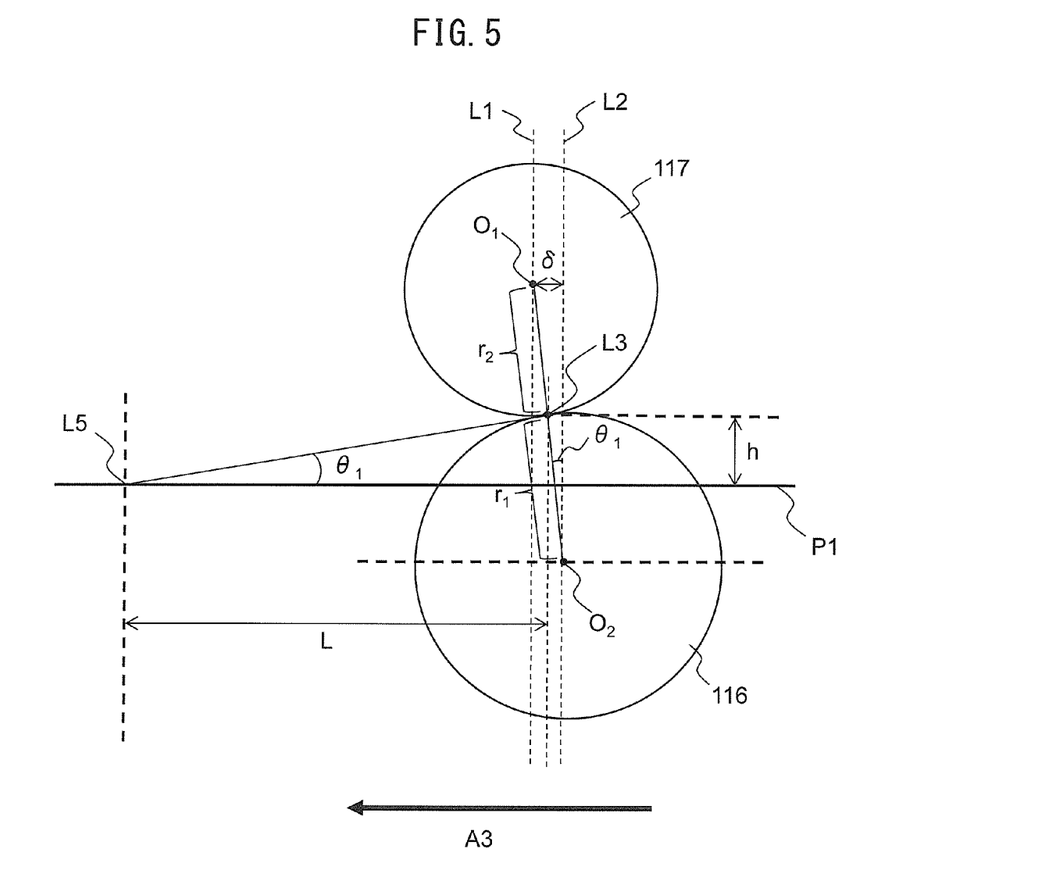
FIG. 5 is a view for explaining a first conveyor roller 116 and a first driven roller 117.

FIG. 5 is a view for explaining the arrangement of the first conveyor roller 116 and the first driven roller 117.

The distance "h" between the nip position L3 of the first conveyor roller 116 and the first driven roller 117 and the extended plane P1 of the glass surface 135a is set so as to become larger than the height of the embossing which can be formed on a card which is conveyed. Similarly, the distance between the nip position L8 of the second conveyor roller 140 and the second driven roller 141 and the extended plane P3 of the glass surface 135a which is shown in FIG. 3 is set so as to become larger than the height of the embossing which can be formed on a card which is conveyed. The height of this embossing can be determined by the hardware specifications and, for example, can be made the height of 0.46 mm of embossing of an IC card which is prescribed in ISO/IEC7811-1 or the height of 0.48 mm of embossing of a card which is prescribed in the JIS (Japanese Industrial Standard).

Further, if the angle of the line which extends from the image capture position L5 of the second image capture sensor 133b to the nip position L3 of the first conveyor roller 116 and the first driven roller 117 with respect to the extended plane P1 is $\theta_1$, the radius of the first conveyor roller 116 is $r_1$, the radius of the first driven roller 117 is $r_2$, the distance from the nip position L3 to the image capture position L5 of the second image capture sensor 133b in the paper conveyance direction A3 is L, and the amount of offset of the center $O_1$ of the first driven roller 117 with respect to the center $O_2$ of the first conveyor roller 116 in the paper conveyance direction A3 is $\delta$, the following equation stands:

$$\sin\theta_1 = \frac{\delta}{r_1 + r_2}, \tan\theta_1 = \frac{h}{L} \qquad \text{[Equation 1]}$$

Therefore, the amount of offset $\delta$ of the center $O_1$ of the first driven roller 117 with respect to the center $O_2$ of the first conveyor roller 116 in the paper conveyance direction can be calculated by the following equation:

$$\delta = (r_1 + r_2) \times \sin\left(\tan^{-1}\left(\frac{h}{L}\right)\right) \qquad \text{[Equation 2]}$$

The position L4 which is shown in FIG. 3 is arranged so as to become more to the first conveyor roller 116 and the first driven roller 117 side compared with the image capture position L5, so it is sufficient to offset the center $O_1$ of the first driven roller 117 in the paper conveyance direction A3 by $\delta$ or more compared with the center $O_2$ of the first conveyor roller 116. For example, when "h" is 1.5 mm, $r_1$ is 6.8 mm, $r_2$ is 6.5 mm, and L is 18.7 mm, the amount of offset of the center $O_1$ of the first driven roller 117 with respect to the center $O_2$ of the first conveyor roller 116 may be made 1.1 mm.

Figure 6:
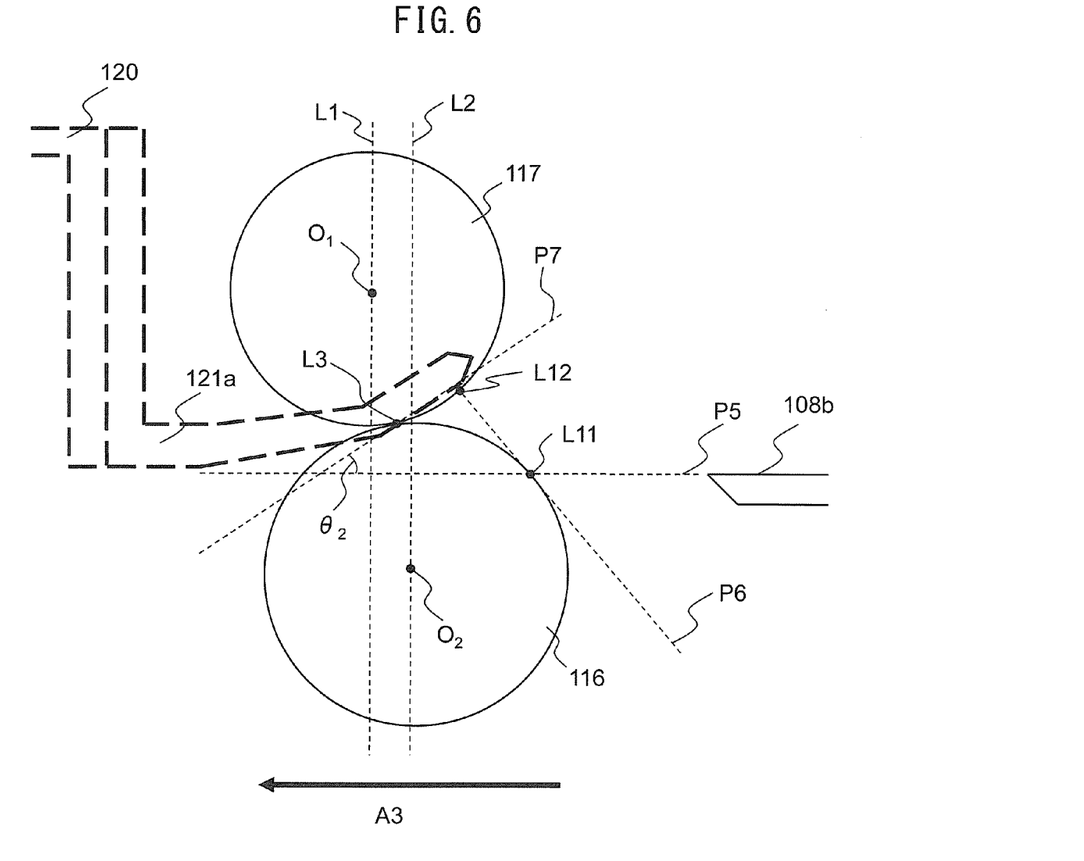
FIG. 6 is a view for explaining the arrangement of an image capture unit guide 120.

FIG. 6 is a view for explaining the arrangement of the image capture unit guide 120 and the first conveyor roller 116 and first driven roller 117.

FIG. 6 is a view which shows parts in the direction of the arrow marks X, X' from a position cutting part of the guide member 121a of the image capture unit guide 120 at the arrow mark X-X' of FIG. 4A. Below, the arrangement of the guide member 121a of the image capture unit guide 120 will be explained, but the guide members 121b and 121c are similarly arranged.

The plane P6 shows the tangent plate which contacts the first conveyor roller 116 at the position L11 where the extended plane P5 of the conveyance surface of the lower guide 108b extending to the first conveyor roller 116 and first driven roller 117 side and the first conveyor roller 116 contact. The front end of the guide member 121a of the image capture unit guide 120 is arranged so as to be positioned more to the lower guide 108b side in the paper conveyance direction A3 compared with the position L12 where the tangent plane P6 and the first driven roller 117 contact. For example, the front end of the guide member 121a is preferably arranged so as to be positioned more to the lower guide 108b side in the paper conveyance direction A3 by exactly 5 to 10 mm compared with the position L2 of the center $O_2$ of the first conveyor roller 116.

Note that, an experiment was conducted in which the angle $\theta_2$ of the extended plane P7 of the surface of the guide members 121 which contact the front end of the paper with respect to the extended plane P5 of the conveyance surface of the lower guide 108b was changed while conveying the paper. As a result, it was confirmed that when the angle $\theta_2$ is larger than 30°, the front end of the paper is not guided between the first conveyor roller 116 and the first driven roller 117, but ends up turning upward (first driven roller 117 side) resulting in the possibility of a jam occurring.

Therefore, the guide member 121a is preferably arranged so that the angle $\theta_2$ of the extended plane P7 with respect to the extended plane P5 becomes 30° or less. By arranging it in this way, it is possible to reduce the incidence of the front end of the paper not being guided between the first conveyor roller 116 and the first driven roller 117 and a jam being caused. Further, the angle of the guide member 121a with respect to the extended plane P5 is 30° to 5° in range. By arranging the member so that the angle becomes gradually smaller the closer to the image capture units 130, the paper can be guided precisely between the first image capture unit 130a and the second image capture unit 130b.

Further, the guide member 121a is arranged so as to lay over the first conveyor roller 116 in the cross-section vertical to the axis of rotation of the first conveyor roller 116. That is, when viewed from the direction which perpendicularly intersects the paper conveyance direction A3, the member is arranged so that at least part of the bottom surface of the guide member 121a is positioned lower than the top surface of the first conveyor roller 116.

Figure 7:
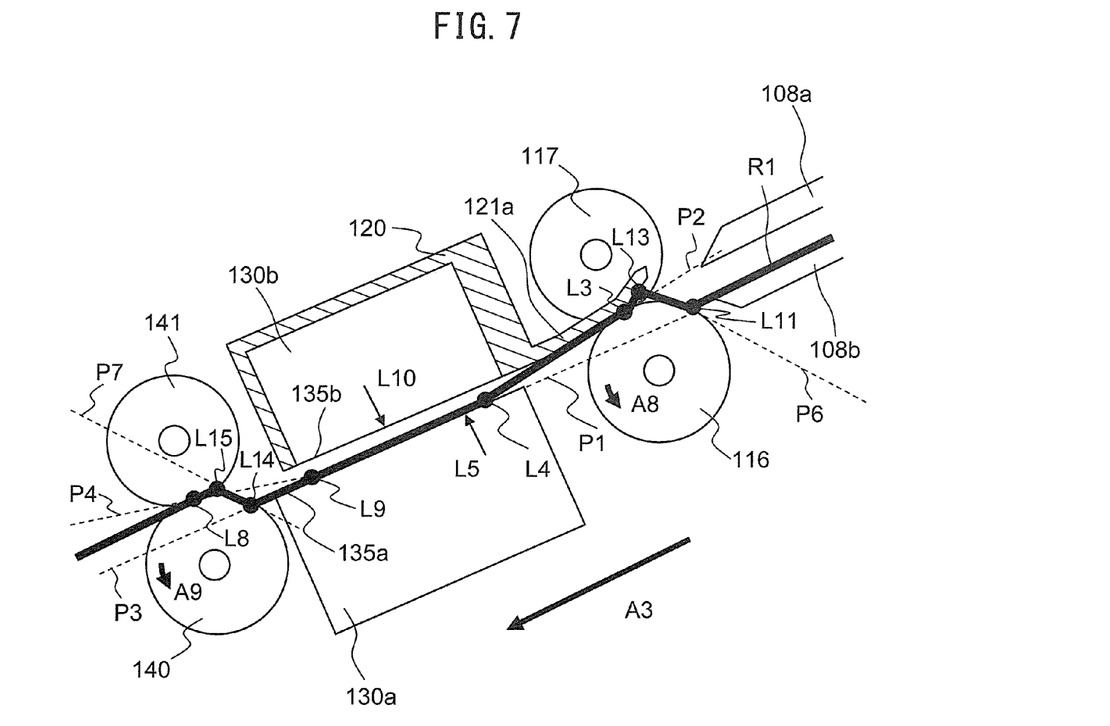
FIG. 7 is a view for explaining a state when paper has been conveyed.

FIG. 7 is a view for explaining the state where paper is conveyed.

FIG. 7 is a view which shows parts in the direction of the arrow marks X, X' from a position cutting part of the guide member 121a of the image capture unit guide 120 at the arrow mark X-X' of FIG. 4A. The route R1 shows the route over which the front end of the paper which is ideally conveyed passes.

The paper which is placed on the paper tray 103 is conveyed between the upper guide 108a and the lower guide 108b toward the paper conveyance direction A3 by the paper feed roller 113 rotating in the direction of the arrow mark A6 of FIG. 2. The retard roller 114 rotates in the direction of the arrow mark A7 of FIG. 2 at the time of paper conveyance. Due to the action of the paper feed roller 113 and the retard roller 114, when a plurality of sheets of paper are placed on the paper tray 103, among the sheets of paper which are placed on the paper tray 103, only the paper which is contacting the paper feed roller 113 is separated and conveyance of paper other than the separated paper is restricted (prevention of double feed) in operation.

The front end of paper which is guided by the lower guide 108b contacts the first conveyor roller 116 at the position L11 and heads along the tangent plane P6 of the first conveyor roller 116 upward from the extended plane P1 of the glass surface 135a. After that, the front end of the paper contacts the guide member 121a of the image capture unit guide 120 at the center part at the position L13 and contacts the guide member 121b and guide member 121c to turn downward at the end parts.

The front end of the paper which is turned downward by the guide members 121a, 121b and 121c is fed between the first conveyor roller 116 and the first driven roller 117. By rotation of the first conveyor roller 116 in the direction of the arrow mark A8, the front end of the paper passes the nip position L3 of the first conveyor roller 116 and the first driven roller 117, advances along the tangent plane P2 at the nip position L3 of the first conveyor roller 116 and the first driven roller 117, and contacts the glass surface 135a of the first image capture sensor 133a at the position L4.

Note that, as explained above, the guide members 121a, 121b and 121c are arranged so that at least part of the bottom surfaces are positioned below the top surface of the first conveyor roller 116, so it is possible to reduce the incidence of the paper rising up (first driven roller 117 side) and the occurrence of a jam. Paper which contacts the first conveyor roller 116 and turns upward tends in particular to rise up near the center part in the paper width. However, the guide member 121a which is arranged at the center part can be used to suppress a rise of the paper near the center part.

Further, when paper with an entire front end which is bent is conveyed, even if the front end of the paper is correctly inserted between the first conveyor roller 116 and the first driven roller 117, there is a high possibility of the ends in the paper width not being inserted between the first image capture unit 130a and the second image capture unit 130b and of a jam occurring. However, the guide member 121b and guide member 121c which are arranged at the ends in the paper width can be used to suitably guide the front end of paper with an entire front end which is bent to between the first image capture unit 130a and the second image capture unit 130b at the ends in the paper width and to reduce the occurrence of a jam.

The paper which contacts the glass surface 135a is low in rigidity, so bends, therefore the front end of the paper is conveyed along the glass surface 135a. If the front end of the paper passes between the first image capture unit 130a and the second image capture unit 130b, it advances along the extended plane P3 of the glass surface 135a and contacts the second conveyor roller 140 at the position L14. The front end of the paper which contacts the second conveyor roller 140 advances along the tangent plane P7 of the second conveyor roller 140 at the position L14 and contacts the second driven roller 141 at the position L15.

The front end of the paper which contacts the second driven roller 141 is fed between the second conveyor roller 140 and the second driven roller 141. The second conveyor roller 140 rotates in the direction of the arrow mark A9 whereby the front end of the paper passes the nip position L8 of the second conveyor roller 140 and the second driven roller 141 and is ejected to the front surface cover 105a.

Note that, if the front end of the paper passes the nip position L8 of the second conveyor roller 140 and the second driven roller 141, the part of the paper which is positioned on the glass surface 135a is pulled along the tangent plane P4 at the nip position L8 and is separated from the glass surface 135a at the second conveyor roller 140 and second driven roller 141 side from the position L9.

The paper is constantly maintained at a predetermined distance from the glass surface 135a at the image capture position L5 of the second image capture sensor 133b and the image capture position L10 of the first image capture sensor 133a. The distances from the paper to the first image capture sensor 133a and the second image capture sensor 133b become constant, so stable image data can be obtained. Note that, the front end of the paper is conveyed along the glass surface 135a, so the front end of the paper can clean the glass surface 135a, that is, can remove dirt from the glass surface 135a.

Figure 8:
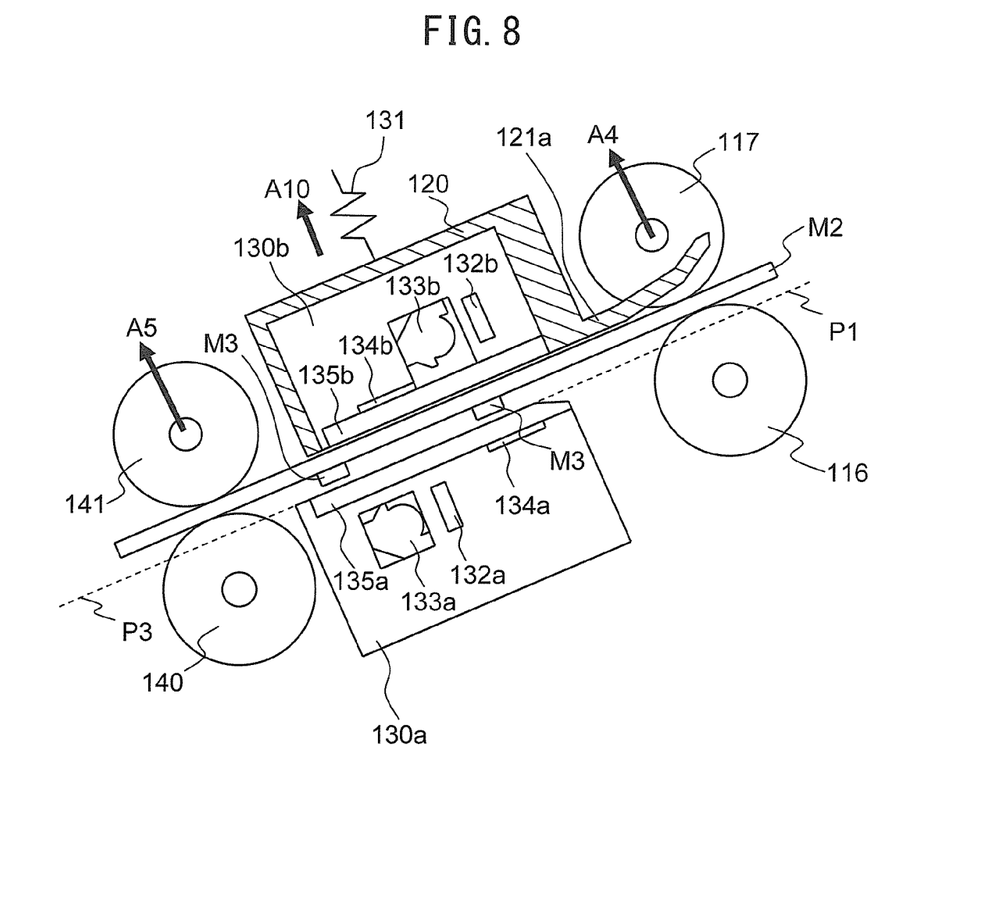
FIG. 8 is a view for explaining a state when a card has been conveyed.

FIG. 8 is a view for explaining the state when a card M2 which has embossing M3 is conveyed.

FIG. 8 is a view which shows parts in the direction of the arrow marks X, X' from a position cutting part of the guide member 121a of the image capture unit guide 120 at the arrow mark X-X' of FIG. 4A.

The first image capture unit 130a, first conveyor roller 116, and second conveyor roller 140 are fastened in place and will not move even if a card M2 with a high rigidity is conveyed. On the other hand, the image capture unit guide 120 is pushed up by the card M2 and moves in the upward direction (direction of arrow mark A10), while the second image capture unit 130b moves integrally with the image capture unit guide 120 in the upper direction due to pushing up movement of the image capture unit guide 120 by the card M2. Further, the first driven roller 117 and second driven roller 141 are also pushed up by the card M2 and move in the upward direction (direction of arrow mark A4 and arrow mark A5).

Note that, when the second image capture unit 130b moves in the upward direction integrally with the image capture unit guide 120, the first guide member 137a and second guide member 137b can be used to hold the glass surface 135b substantially parallel with the glass surface 135a of the first image capture unit 130a while moving in the upward direction.

In general, embossing M3 is formed mostly at one of the two ends in the short direction of a card M2, so when the card M2 is conveyed in the long direction, the embossing M3 is arranged at either the left side or right side of the conveyance direction. Therefore, when the card M2 is conveyed with the embossing M3 facing downward (first image capture unit 130a side), if the embossing M3 contacts the glass surface 135a, the balance of the left and right load on the card M2 is lost, cumulative skew where the card M2 is slanted occurs, and the image data is liable to become distorted. Furthermore, the embossing M3 may contact the glass surface 135a whereby the conveyance speed of the card M2 changes, the image data can no longer be read at a suitable timing, and the image data is liable to become distorted.

On the other hand, in the paper conveying apparatus 100, the nip position of the first conveyor roller 116 and the first driven roller 117 is arranged at a position from the glass surface 135a higher than the height of the embossing M3, so it is possible to reduce contact of the embossing M3 with the glass surface 135a. Furthermore, after the front end of the card M2 is conveyed between the second conveyor roller 140 and the second driven roller 141, the embossing M3 no longer contacts the glass surface 135a of the first image capture unit 130a. Therefore, in the paper conveying apparatus 100, it is possible to reduce the occurrence of cumulative skew of the card M2 and change of the conveyance speed and possible to reduce the occurrence of distortion of the image data.

Figure 9:
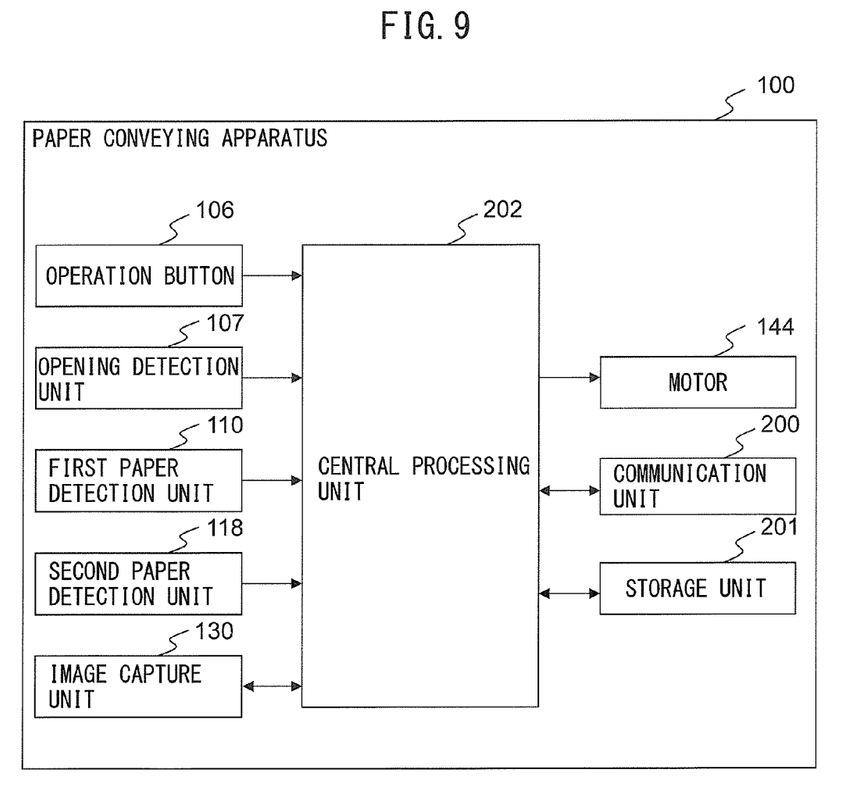
FIG. 9 is a view which shows the schematic configuration of a paper conveying apparatus 100.

FIG. 9 is a view which shows the schematic configuration of a paper conveying apparatus 100. The paper conveying apparatus 100, in addition to the configuration which is shown in the figures, further has a communication unit 200, storage unit 201, and central processing unit 202.

The communication unit 200 has an antenna which sends and receives a wireless signal and a wireless communication interface circuit for sending and receiving a signal through a wireless communication line in accordance with a predetermined communication protocol and communicates through an access point (not shown) with a portable information terminal or other information processing apparatus (not shown). Note that, the communication unit 200 may also directly communicate with the information processing apparatus without going through an access point. Alternatively, the communication unit 200 has a cable communication interface circuit which sends and receives signals through a cable communication line in accordance with a predetermined communication protocol and may communicate by cable with a information processing apparatus.

The storage unit 201 has a RAM (random access memory), ROM (read only memory), or other memory device, a hard disk or other fixed disk device, or flexible disk, optical disk, or other portable storage device. Further, the storage unit 201 stores a computer program, database, tables, etc. which are used in various processing of the paper conveying apparatus 100. The computer program may be installed on the storage unit 201 from a computer-readable, non-transitory medium such as a compact disk read only memory (CD-ROM), a digital versatile disk read only memory (DVD-ROM), or the like by using a well-known setup program or the like. Furthermore, the storage unit 201 stores the image data which is generated from the paper.

The central processing unit 202 is provided with a CPU (central processing unit) and operates based on a program which is stored in advance in the storage unit 201. Note that, the central processing unit 202 may also be comprised of a DSP (digital signal processor), LSI (large scale integrated circuit), ASIC (application specific integrated circuit), FPGA (field-programming gate array), etc. The central processing unit 202 is connected to the operation button 106, opening detector 107, first paper detector 110, second paper detector 118, image capture units 130, motor 144, communication unit 200, and storage unit 201 and controls these parts.

The central processing unit 202 detects that the user has opened and set the paper tray 103 based on the opening detection signal which is received from the opening detector 107, and detects that a paper is placed on the paper tray 103 based on the first paper detection signal which is received from the first paper detector 110. Further, the central processing unit 202 follows the operation detection signal which is received from the operation button 106 to control the drive operation of the motor 144 and control the read operation of paper by the image capture units 130, reads the paper to generate image data, and transmits it to a preset destination. Further, the central processing unit 202 judges any double feed of paper based on the electrical signal which is received from the ultrasonic receiver 115b. If detecting double feed of paper, it makes the rotation of the motor 144 stop to stop the conveyance of the paper.

As explained above in detail, in the paper conveying apparatus 100, the nip position of the first conveyor roller 116 and the first driven roller 117 is arranged above the glass surface 135a of the first image capture unit 130a, while the center $O_1$ of the first driven roller 117 is arranged offset more to the first image capture unit 130a side compared with the center $O_2$ of the first conveyor roller 116. Therefore, the front end of the paper is conveyed along the glass surface 135a, so the paper is not conveyed wrinkled, blurring of the image at the time of capture and uneven brightness are suppressed, and a drop in quality of the captured image data can be prevented.

Furthermore, the paper conveying apparatus 100 makes the paper which was conveyed upward turn downward by the guide members 121 of the image capture unit guide 120, so in particular when the paper is thin or even when the front end of paper is bent, the occurrence of a jam can be reduced and stable conveyance of paper becomes possible. To reduce the occurrence of a jam, arranging the first image capture unit 130a and the second image capture unit 130b at a broad distance is the general practice, but application of the image capture unit guide 120 enables the occurrence of a jam to be reduced, so the first image capture unit 130a and the second image capture unit 130b can be arranged at a narrow distance. By arranging the first image capture unit 130a and the second image capture unit 130b at a narrow distance, it becomes possible to suppress wrinkling of paper between the first image capture unit 130a and the second image capture unit 130b and further suppress blurring of captured image data, uneven brightness, etc.

Furthermore, in the paper conveying apparatus 100, paper is conveyed with its front end along the glass surface 135a, so the front end of the paper can be used to clean the glass surface 135a.

Furthermore, in the paper conveying apparatus 100, the nip position of the first conveyor roller 116 and the first driven roller 117, and the nip position between the second conveyor roller 140 and the second driven roller 141 are set to become higher than the height of embossing which can be formed on a conveyed card, with respect to the glass surface 135a. Therefore, the paper conveying apparatus 100 can suppress occurrence of cumulative skew when a card which has embossing has been conveyed and can suppress occurrence of distortion in the image data.

According to the paper conveying apparatus, the nip position of the pair of conveyor rollers is arranged above the top surface of the lower image capture unit, the axis of rotation of the upper roller is arranged offset to the image capture side compared with the axis of rotation of the lower roller, and the paper which is conveyed upward is made to turn downward by a guide which is arranged at the upper image capture unit, so it becomes possible to prevent a drop in quality of the image data which is captured while enabling stable conveyance of paper.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. A paper conveying apparatus comprising:
   a first image capture unit for capturing an image of a sheet shaped medium;
   a second image capture unit, arranged facing the first image capture unit above the first image capture unit, for capturing an image of a surface at an opposite side from the surface of the medium which the first image capture unit captures;
   a pair of conveyor rollers having a first roller which conveys the medium to the first image capture unit and the second image capture unit, and a second roller arranged facing the first roller above the first roller;
   a first conveyor guide arranged at the second image capture unit; and
   a second conveyor guide for guiding the medium to the pair of conveyor rollers, wherein
   a nip position of the pair of conveyor rollers is arranged above an extended plane of a top surface of the first image capture unit extended to the pair of conveyor rollers side,
   an axis of rotation of the second roller is arranged offset to the first image capture unit side compared with an axis of rotation of the first roller at projections on the extended plane, and the first conveyor guide guides the medium, which is guided from the second conveyor guide and is conveyed by the first roller to above the extended plane, to make the medium turn downward.

2. The paper conveying apparatus according to claim 1, wherein a front end of the first conveyor guide is arranged to be positioned at the second conveyor guide side compared with the position where a tangent plane and the second roller contact, wherein the tangent plane contacts the first roller at the position where an extended plane of a conveyor surface of the second conveyor guide extended to the pair of conveyor rollers side and the first roller contact.

3. The paper conveying apparatus according to claim 1, wherein the first conveyor guide is arranged so that an angle with respect to an extended plane of a conveyor surface of the second conveyor guide extended to the pair of conveyor rollers side becomes 30° or less.

4. The paper conveying apparatus according to claim 1, wherein the pair of conveyor rollers are arranged so that the position, where a tangent plane which contacts the first roller at the nip position of the first roller and the second roller and the top surface of the first image capture unit contact, becomes the pair of conveyor rollers side compared with the image capture position of the second image capture unit.

5. The paper conveying apparatus according to claim 1, wherein the second image capture unit moves in an upward direction away from the first image capture unit, due to pushing up movement of the first conveyor guide by the medium.

6. The paper conveying apparatus according to claim 5, further comprising a guide member for enabling the second image capture unit to move in said upward direction while holding a bottom surface of the second image capture unit to be substantially parallel with a top surface of the first image capture unit.

7. The paper conveying apparatus according to claim 1, wherein the distance between a nip position of the pair of conveyor rollers and the extended plane of the top surface of the first image capture unit extended to the pair of conveyor rollers side is set to be larger than a height of an embossing which can be formed on the medium.

8. The paper conveying apparatus according to claim 7, further comprising a second pair of conveyor rollers which include a third roller which further conveys the medium from the first image capture unit and the second image capture unit, and a fourth roller arranged facing the third roller above the third roller, and wherein
a distance between a nip position of the second pair of conveyor rollers and the extended plane of the top surface of the first image capture unit extending to the second pair of conveyor rollers side is set to be larger than the height of the embossing which can be formed on the medium,
the first roller, the third roller, and the first image capture unit are fastened, and
the second roller, the fourth roller, and the second image capture unit are configured to be able to move in an upward direction away from the first image capture unit, by being pushed up by the medium.

9. The paper conveying apparatus according to claim 1, wherein the first conveyor guide is arranged so as to overlap the first roller in a cross-section vertical to an axis of rotation of the first roller.

* * * * *